McCLELLAN McINTOSH.
VEHICLE WHEEL.
APPLICATION FILED MAY 10, 1911.
1,034,390.
Patented July 30, 1912.
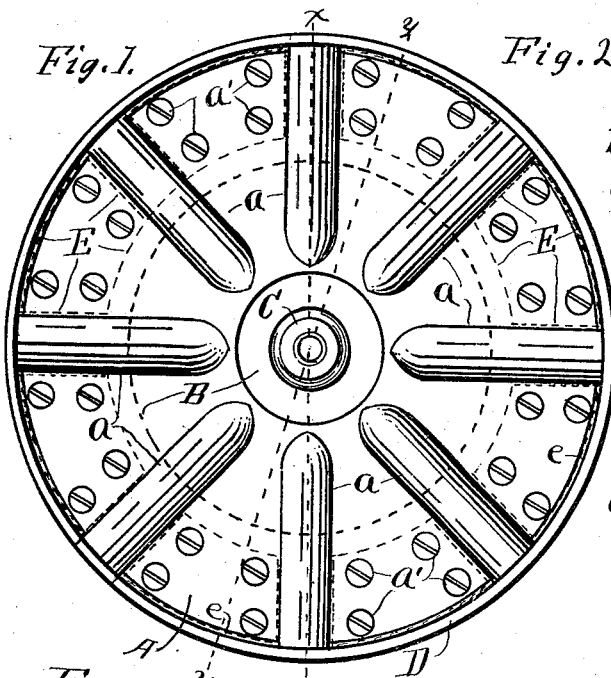
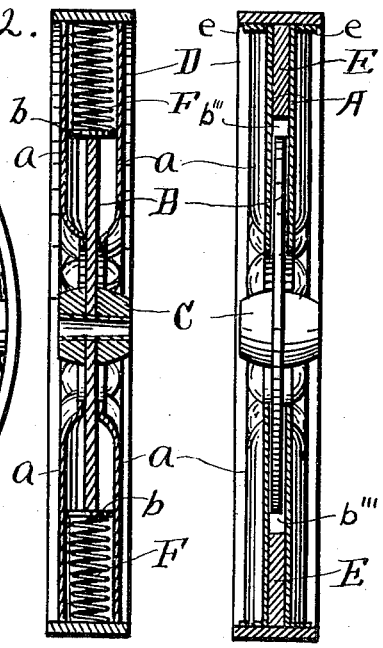
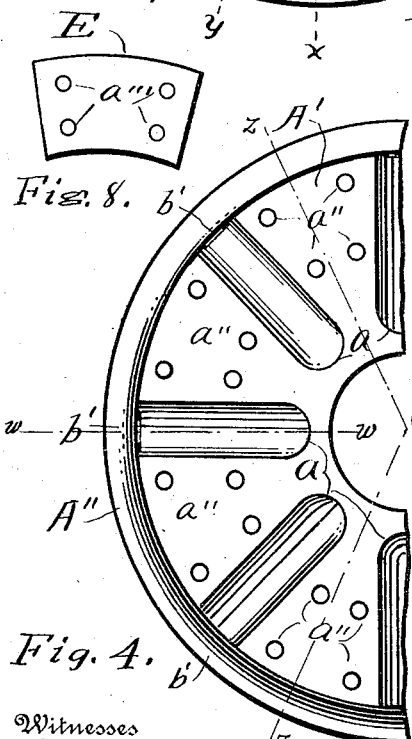
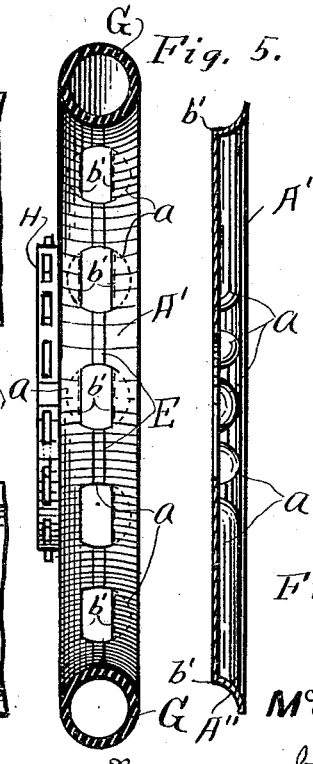
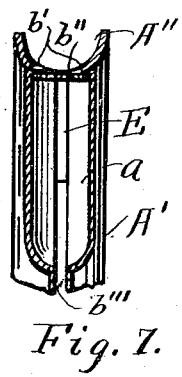
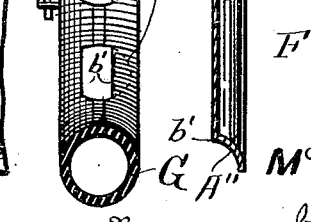
Witnesses
J. T. Cloney
C. N. McDuffie
Inventor
McClellan McIntosh,
By Ithiel J. Cilley
Attorney
COLUMBIA PLANOGRAPH CO., WASHINGTON, D. C.

UNITED STATES PATENT OFFICE.

McCLELLAN McINTOSH, OF ALLEGAN, MICHIGAN, ASSIGNOR OF ONE-FOURTH TO JOHN T. CLONEY AND ONE-FOURTH TO CHARLES N. McDUFFIE, BOTH OF ALLEGAN, MICHIGAN.

VEHICLE-WHEEL.

1,034,390.  Specification of Letters Patent.  Patented July 30, 1912.

Application filed May 10, 1911. Serial No. 626,391.

*To all whom it may concern:*

Be it known that I, McCLELLAN McINTOSH, a citizen of the United States, residing at Allegan, in the county of Allegan and State of Michigan, have invented certain new and useful Improvements in Vehicle-Wheels, of which the following is a specification.

My invention relates to improvements in vehicle wheels, for use upon automobiles, buggies, street cars, and other vehicles, and its objects are: First to provide a vehicle wheel that will render perfect resiliency with the use of either a hard tire, as steel, or a soft tire, as solid rubber, pneumatic tires &c. Second, to provide a perfectly resilient wheel in which the source of resiliency is located between the rim and the hub of the wheel. Third, to provide a wheel made from two plates of sheet metal having a slot between them to receive and rigidly hold a supporting disk and the resilient elements of the wheel. I attain these objects by the mechanism illustrated in the accompanying drawing, in which—

Figure 1 is a side elevation of the wheel showing an ordinary steel tire surrounding it. Fig. 2 is a sectional elevation of the same on the line $x\ x$ of Fig. 1 showing the relative position of the disk and springs. Fig. 3 is a section of the wheel on the line $y\ y$ of Fig. 1. Fig. 4 is a plan of the inner surface of one half of one side of the case that incloses the springs and supports the edge of the disk. Fig. 5 is an edge elevation of a wheel rim fitted to carry a pneumatic tire, and showing such tire in cross section at the top and bottom of the rim. Fig. 6 shows a sectional view of this wheel practically on the line $z\ z$ of Fig. 4. Fig. 7 is a part of one side of the wheel shown in section practically on the line $w\ w$ of Fig. 4. Fig. 8 is an enlarged plan of the supporting elements that are to be placed between the side plates of the wheel between the spring cylinders for the purpose of securing the two sides firmly together.

The simpler form of this wheel is made of two plates of sheet metal, as A, having half cylinders $a\ a$ formed in each sheet and so arranged that they will exactly register when the plates are secured together to form cylinders for the reception and free action of the springs F. These two plates have a series of plates E, placed between them, between each two cylinders, to form a groove $b'''$ between the plates A for the reception of the disk B. This disk is securely attached to the hub C of the wheel and is of a proper thickness to pass freely but very closely between the plates A and to extend well out from the hub into this groove, as indicated by the dotted lines in Fig. 1 and as shown in Figs. 2 and 3, so that the outer, or rim portion of the wheel is held firmly from the danger of sidewise movement thereon.

The wheel so far described requires an independent rim, as D, around it to form a bearing and supporting element for the springs at the outer ends, and I prefer the use of a small metal disk, as $b$, arranged to bear upon the edge of the disk B, to form resisting elements for the inner ends of the springs F.

To provide the proper resiliency for the wheel I use the desired or required number of very strong steel spiral springs, as F F, which are placed in the cylinders $a$ and pressed down to very close tension when the disk B is placed in position to engage the inner ends of said springs as indicated in Fig. 2, when the two plates A are properly placed together with the plates E between them and firmly secured, as by the several screws $a'$ shown in Fig. 1, or by any other of the many well known means whereby the desired result may be attained. A sufficient space is left between the hub C and the inner edges of the plates A, and also between the outer edge of the disk B and the inner edges of the plates E to allow of considerable radial movement between the plates or rim A D, and the edge of the disk B, without danger of the parts coming together with a sudden jar when the wheel is being driven over rough roads.

With this wheel it is desirable that the outer edges of the plates A should be turned outward to form narrow flanges as shown at $e\ e$, to receive and support the tire or rim D.

In Figs. 4 and 8 the holes $a''$ and $a'''$ are designed for the reception of the screws $a'$, or other securing elements for holding the plates securely together when the wheel is fully assembled and ready for use.

In Figs. 4, 5, 6 and 7 I have shown a modified form of wheel with which the tire rim is formed integral with the side plates of the wheel, and with which the special rim or tire D is not necessary or applicable, the rim A″ being stamped integral with the plates A′. With this form of wheel I am required to provide some means of resistance for the outer ends of the springs F F and for this purpose I find that the most economical and readily provided appliance consists of forming narrow offsets, as $b'$, in the plates at the outer ends of the cylinders $a$, and placing a small strong disk, as $b''$, in the cylinders to bear upon these disks, exactly as the outer ends of the springs F bear against the inner surface of the tire D in Fig. 2.

The germ of my invention lies in the use of the disk B securely connected to the hub C, and the passage of the disk into a slot or slots in such a manner as to render the wheel absolutely rigid so far as sidewise movement of the outer portion or rim of the wheel upon the disk is concerned, together with a series of springs radiating from the edge of the disk to the tire or rim of the wheel, said springs properly incased, it being evident that the use of the plates A or A′ is quite necessary for the purpose of giving strength and rigidity to the wheel to carry out the invention.

H represents a sprocket wheel that is secured to the cylinders $a$ for driving the wheel with a sprocket chain.

What I claim as new, and desire to secure by Letters Patent of the United States, is:

In combination with the rim, tire and hub of a vehicle wheel, a thin circular disk securely connected with the hub and extending well outward toward the rim, plates stamped to form the rim of the wheel and radiating cylinders in the body of the wheel and extending well inward toward the hub, slight offsets in the outer ends of the cylinders, small disks supported in the cylinders against said offsets, said plates secured together flatwise to form the rim and cylinders and a slot between them for the reception of the disk, small disks in the cylinders bearing flatwise upon the edge of the disk, and spiral springs in the cylinders between, and pressing heavily upon the disks at both ends of said cylinders.

Signed at Allegan, Michigan, May 8, 1911.

McCLELLAN McINTOSH.

In presence of—
  J. T. CLONEY,
  CHAS. H. DUFFIE.

---

Copies of this patent may be obtained for five cents each, by addressing the "Commissioner of Patents, Washington, D. C."